(12) United States Patent
Kempfer et al.

(10) Patent No.: US 10,011,305 B2
(45) Date of Patent: Jul. 3, 2018

(54) MOTOR VEHICLE WITH AIR AND WATER GUIDING ARRANGEMENT

(71) Applicant: GM GLOBAL TECHNOLOGY OPERATIONS LLC, Detroit, MI (US)

(72) Inventors: Fabian Kempfer, Ruesselsheim (DE); Younes Chlyeh, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 53 days.

(21) Appl. No.: 15/349,304

(22) Filed: Nov. 11, 2016

(65) Prior Publication Data

US 2017/0137068 A1  May 18, 2017

(30) Foreign Application Priority Data

Nov. 12, 2015  (DE) ........................ 10 2015 014 620

(51) Int. Cl.
| | |
|---|---|
| *B60N 99/00* | (2006.01) |
| *B62D 25/08* | (2006.01) |
| *B60H 1/26* | (2006.01) |
| *B60R 13/07* | (2006.01) |

(52) U.S. Cl.
CPC .............. *B62D 25/08* (2013.01); *B60H 1/267* (2013.01); *B60R 13/07* (2013.01)

(58) Field of Classification Search
CPC .......... B62D 25/08; B60H 1/267; B60R 13/07
See application file for complete search history.

(56) References Cited

U.S. PATENT DOCUMENTS

| | | | |
|---|---|---|---|
| 8,864,217 B2 | 10/2014 | Schneider et al. | |
| 2010/0187862 A1* | 7/2010 | Kurata | B60R 13/04 296/192 |
| 2013/0300154 A1* | 11/2013 | Schaefer | B62D 25/081 296/192 |

FOREIGN PATENT DOCUMENTS

| | | |
|---|---|---|
| DE | 4006208 A1 | 8/1991 |
| DE | 10341129 B3 | 2/2005 |
| DE | 102007017427 A1 | 11/2008 |
| DE | 102011105057 A1 | 12/2012 |
| DE | 202013008973 U1 | 1/2015 |
| DE | 102013017183 A1 | 4/2015 |
| DE | 102013017885 A1 | 4/2015 |
| FR | 2623455 A1 | 5/1989 |

OTHER PUBLICATIONS

German Patent Office, German Search Report for German Application No. 102015014620.3, dated Dec. 8, 2016.

* cited by examiner

*Primary Examiner* — Lori L Lyjak
(74) *Attorney, Agent, or Firm* — Lorenz & Kopf, LLP

(57) ABSTRACT

A motor vehicle is disclosed with a windshield, a hood and an air and water guiding arrangement that extends from the base of the windshield underneath the hood. A base plate of the air and water guiding arrangement features at least one air passage opening underneath the hood. A transverse wall, in which passages for air are recessed, rises from the base plate along a rear edge of the hood.

16 Claims, 3 Drawing Sheets

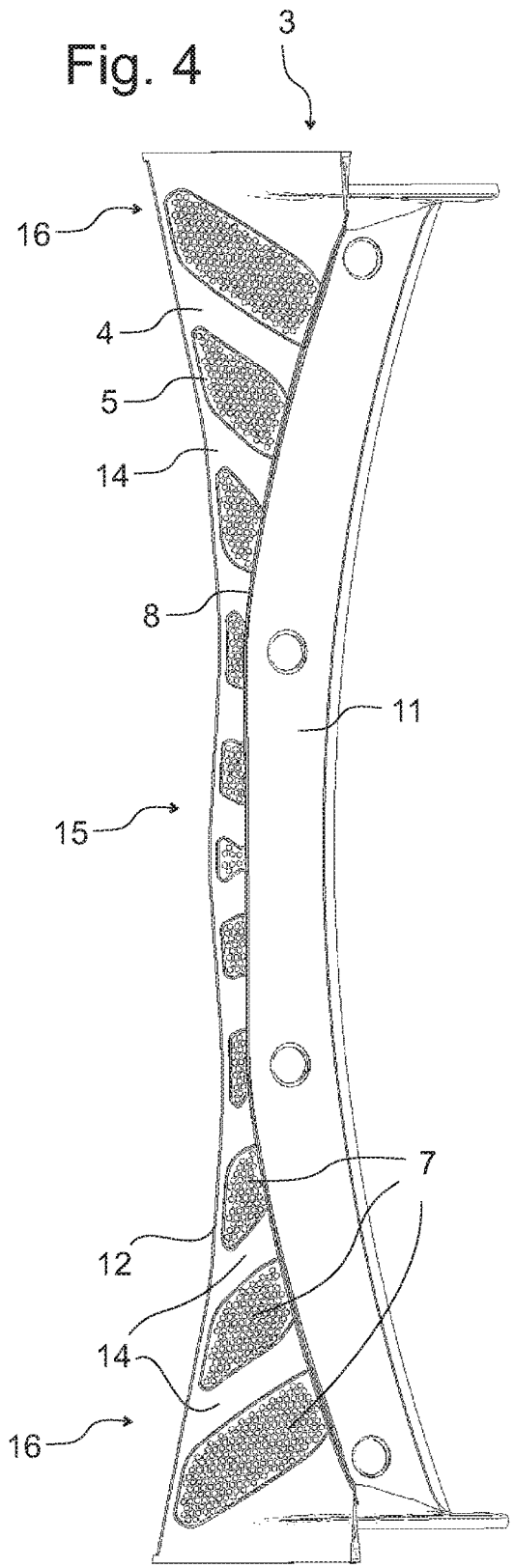

MOTOR VEHICLE WITH AIR AND WATER GUIDING ARRANGEMENT

CROSS-REFERENCE TO RELATED APPLICATION

This application claims priority to German Patent Application No. 102015014620.3, filed Nov. 12, 2015, which is incorporated herein by reference in its entirety.

TECHNICAL FIELD

The present disclosure pertains to a motor vehicle with an air and water guiding arrangement that is configured at the base of a windshield in order to deflect rain water running off the windshield toward the sides of the vehicle.

BACKGROUND

Some water and air guiding arrangements have an air passage opening that is connected to the interior of the motor vehicle, e.g., by an air-conditioning system. If rain water is admitted into this air passage opening, it sooner or later reaches the passenger compartment—in liquid form or in the form of water vapor that condenses on the windows of the passenger compartment. It is therefore important to reliably keep water away from the air passage opening.

DE 20 2013 008 973 U1 describes a water guiding system, in which water running off a windshield is collected in a channel at the base of the windshield and drains toward the sides of the vehicle. On its side that faces away from the windshield, the channel is defined by a wall that obliquely ascends up to a ridge line extending underneath the rear edge of a hood. An air passage opening is located beyond the ridge line in a wall that obliquely descends forward. The relative wind of the moving motor vehicle can cause turbulences in the channel between the windshield and the hood. These turbulences carry the water from the channel over the ridge line and on the forwardly descending wall such that it ultimately reaches the air passage opening.

SUMMARY

The present disclosure minimizes the amount of moisture that reaches the interior of a motor vehicle through the air passage opening.

According to an embodiment of the present disclosure, a motor vehicle include a windshield, a hood and an air and water guiding arrangement that extends from the base of the windshield underneath the hood. A base plate of the air and water guiding arrangement includes an air passage opening underneath the hood. A transverse wall, in which passages for air are recessed, rises from the base plate along a rear edge of the hood. The transverse wall prevents turbulences, which can form behind the hood due to the relative wind, from extending underneath the hood and thereby reduces the amount of water that can be entrained to the air passage opening or into its vicinity by these turbulences.

When air flows through the passages in the transverse wall, particularly when an air-conditioning or ventilation system of the vehicle takes in air through the air passage opening, it is impossible to completely prevent small water droplets from being entrained by this air and reaching the base plate. In order to keep water precipitating on the base plate away from the air passage opening, this air passage opening should be surrounded by a water-impermeable wall on all sides.

A screen extending across the air passage opening may be provided in order to prevent the admission of solid foreign matter. If the screen is integrally connected to an upper edge of the wall, it can be inexpensively deep-drawn together with the base plate.

Air passage openings particularly should be provided on the ends of the base plate that face lateral flanks of the motor vehicle in order to conduct air, which is taken in through these air passage openings by a ventilation or air-conditioning system of the vehicle, to air vents in the passenger compartment along a short path and to thereby minimize the space requirement for the air ducts between the respective system and the air vents. In this case, a central section of the base plate may be narrower than the ends and feature smaller air passage openings than the ends or no air passage openings at all.

During an emergency braking maneuver, the transverse wall may under certain circumstances be struck by a gush of water from the channel In order to remove and thereby prevent this water from spilling over the water-impermeable wall and into an air passage opening, several air passage openings may be formed in a top section and the base plate may between the air passage openings form a laterally sloping trench, in which the spill water can be diverted past the air passage openings.

According to an enhancement of the present disclosure, the upper edge of a passage of the transverse wall does not lie higher than the upper edge of the wall of the air passage opening located closest to the passage in order to thereby impede the admission of water into the air passage opening.

If several air passage openings are formed in a top section and the base plate forms a laterally sloping trench between the walls of two air passage openings, at least one of the passages of the transverse wall should be aligned with a rear end of the trench.

The air and water guiding arrangement advantageously features a channel that extends in the lateral direction of the vehicle between the windshield and a rear edge of its base plate. In this way, the majority of the water running off the windshield are directly diverted laterally without reaching the base plate.

In order to ensure a tightly sealed transition to the windshield, the air and water guiding arrangement carries an apron that tightly adjoins a lower edge region of the windshield. The base plate, the channel and the apron may form an integrally molded plastic component.

A front edge of the base plate should tightly adjoin the hood in order to prevent air from the engine compartment from reaching the passenger compartment through the air passage opening. For this purpose, an upwardly protruding rib on the front edge of the base plate may carry an elastic seal that contacts the hood.

BRIEF DESCRIPTION OF THE DRAWINGS

The present disclosure will hereinafter be described in conjunction with the following drawing figures, wherein like numerals denote like elements.

FIG. 4 shows a top view of the air and water guiding arrangement.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
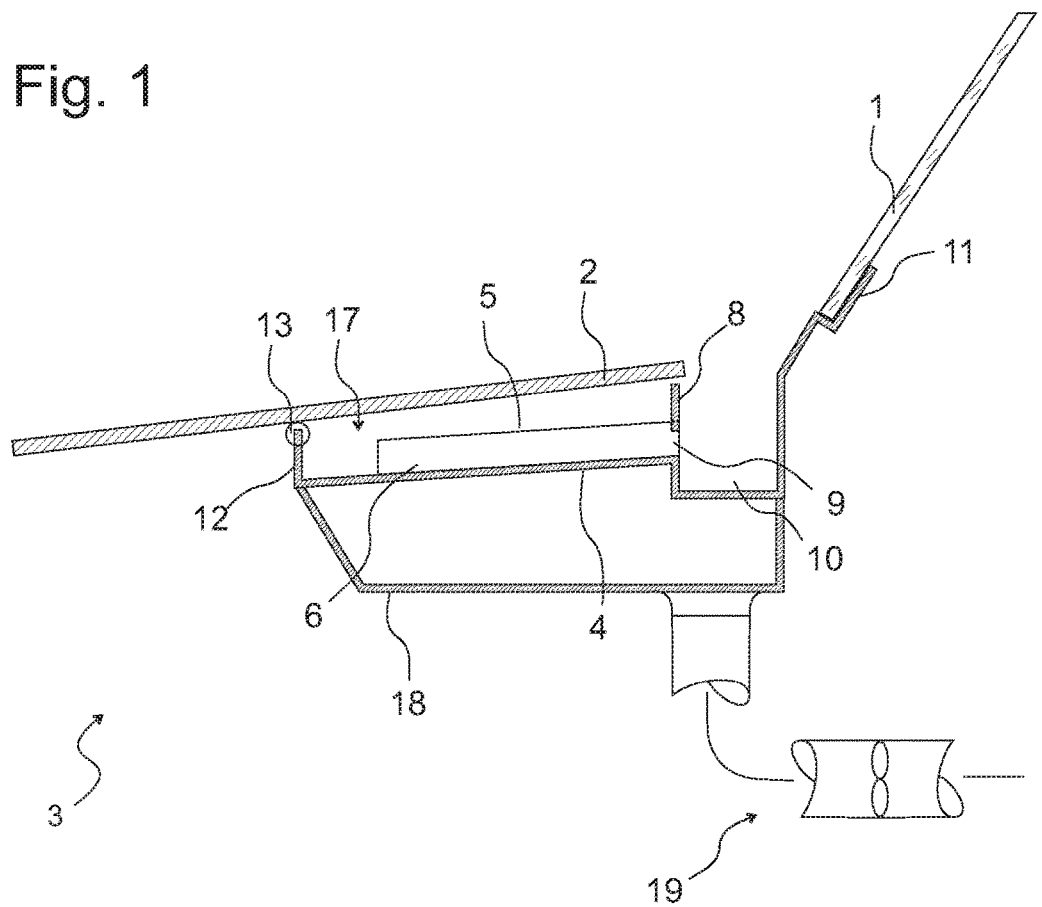
FIG. 1 shows a cross section through the air and water guiding arrangement of an inventive motor vehicle.
Figure 2:
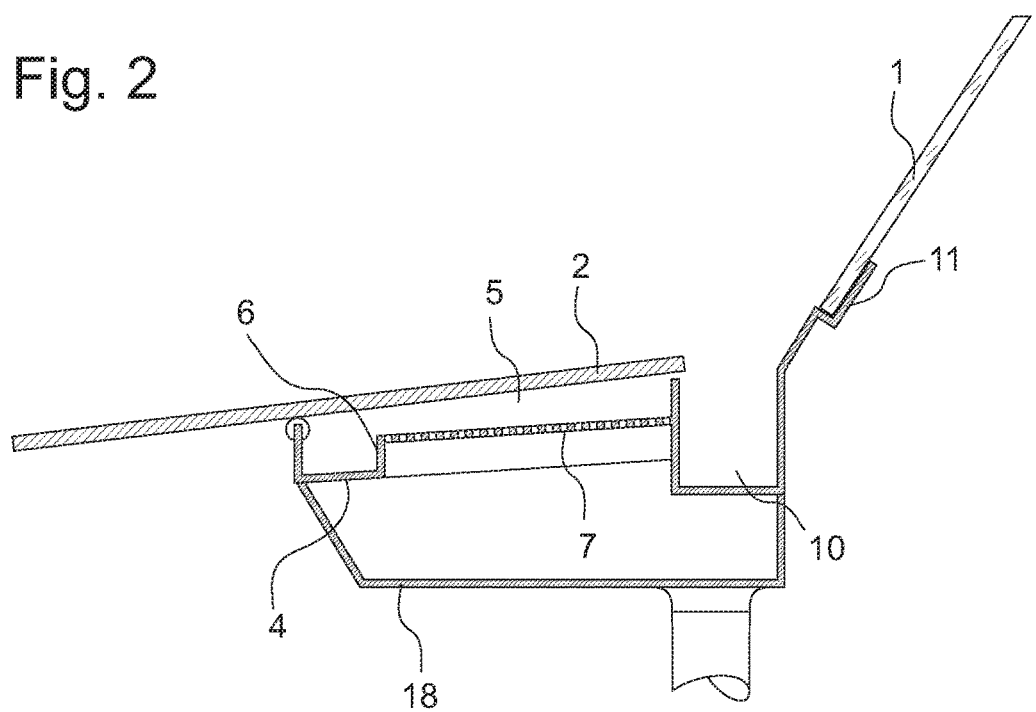
FIG. 2 shows a cross section through the air and water guiding arrangement along a plane of section that is shifted parallel to the plane of section of FIG. 1.
Figure 3:
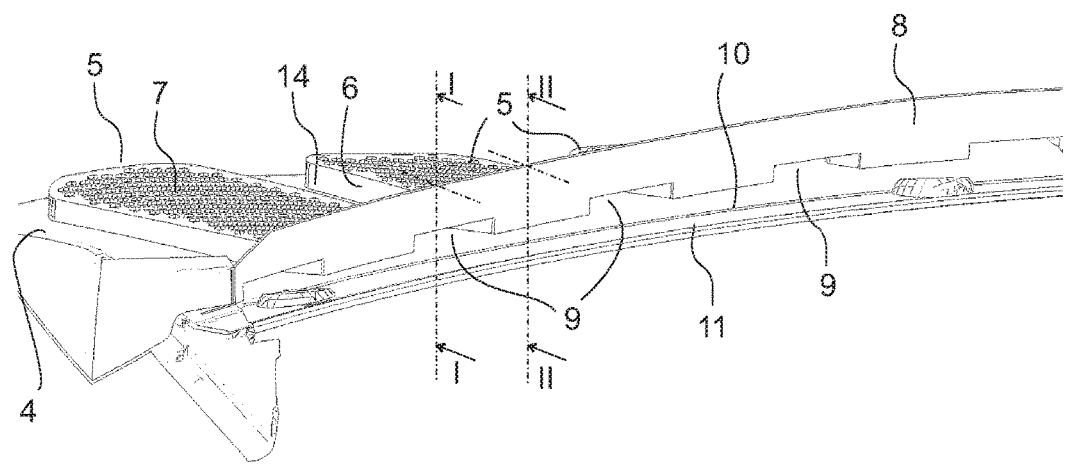
FIG. 3 shows a perspective view of the air and water guiding arrangement.

FIG. 1 and FIG. 2 show sections through an inventive air and water guiding arrangement. The respective planes of section are indicated in the perspective view illustrated in FIG. 3.

A channel 10 extending in the lateral direction of the vehicle is arranged at the base of the windshield 1. Rain water running off the windshield 1 is laterally drained in the channel along a gradient. The windshield 1 tightly adjoins an apron 11. On the side facing away from the windshield 1, the channel 10 is defined by a transverse wall 8 that extends along a rear edge of a hood 2. Passages 9 are recessed in the transverse wall 8 above the base of the channel 10. A base plate 4 extends forward from the transverse wall 8 underneath the hood 2 to flushly adjoin the lower edge of the passages 9, namely up to a rib 12, on which the hood 2 is supported by an elastic seal 13. In this way, the transverse wall 8, the base plate 4, the rib 12 and the hood 2 form a hollow space 17.

Air passage openings 5 are recessed in the base plate 4 and respectively surrounded by a water-impermeable wall 6. The water-impermeable wall 6 protrudes upward from the base plate 4 into the hollow space 17. A screen 7 extending across the air passage opening 5 is integrally connected to an upper edge of the water-impermeable wall 6. The base plate 4, the channel and the apron 11 form an integrally molded plastic component.

The lateral edges of the passages 9 are respectively adjoined by the water-impermeable walls 6 of two air passage openings 5 flanking the passage 9 such that the base plate 4 and the water-impermeable walls 6 jointly form a trench 14. The trenches are laterally and forwardly sloped. The upper edge of a passage 9 of the transverse wall 8 does not lie higher than the upper edge of the water-impermeable wall 6 of the air passage opening 5 located closest to the passage 9 such that there is no straight path that successively extends through a passage 9 and an air passage opening 5.

A plenum chamber 18 extends underneath the base plate 4 and is connected to the hollow space 17 via the air passage openings 5. An air-conditioning system 19 is in turn connected to the plenum chamber in order to feed air taken in from the plenum chamber to the passenger compartment.

The top view in FIG. 4 shows the elongate air and water guiding arrangement 3 extending in the lateral direction of the vehicle. A central section 15 of the base plate 4 is narrower than end sections 16 located toward lateral flanks of the motor vehicle. The air passage openings 5 are distributed over the width of the base plate 4.

In case water from the channel 10 swashes into the hollow space 17 through the passage 9, it is diverted to and ultimately runs off the flanks of the vehicle body past the air passage openings 5 in the trenches 14. The transverse wall 8 prevents turbulences, which can form in the channel 10 behind the hood 2 due to the relative wind, from extending underneath the hood 2 and thereby reduces the amount of water that can be entrained to the air passage opening 5 or into its vicinity by these turbulences.

When the air-conditioning system 19 takes in air, it flows from the channel 10 into the hollow space 17 through the passages 9. If water is located in the channel 10, droplets of this water are entrained by the air flow. The air is sharply deflected in the hollow space 17, namely from a flow direction at the passages 9, which is essentially oriented opposite to the driving direction, to a flow direction at the air passage openings 5, which is essentially oriented vertically downward. Since there is no straight path extending through the passages 9 and the air passage opening 5 and the water droplets can at best follow the directional changes of the air flow slowly due to their higher density. The majority of water droplets precipitate on the walls of the hollow space 17 and ultimately divert past the air passage openings 5 on the base plate 4 as described above with reference to the spill water. In this way, the interior of the plenum chamber 18 remains dry and an undesirable delivery of moisture into the passenger compartment can be prevented.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An air and water guiding arrangement configured to extend from a base of a windshield underneath a hood, the air and water guiding arrangement comprising:
    a base plate having at least one air passage opening underneath the hood; and
    a transverse wall having recessed air passages extending from the base plate and configured to extend along a rear edge of the hood.

2. The air and water guiding arrangement according to claim 1, further comprising a water-impermeable wall surrounding the air passage opening and rising from the base plate on all sides.

3. The air and water guiding arrangement according to claim 2, further comprising a screen extending across the air passage opening and integrally connected to an upper edge of the wall.

4. The air and water guiding arrangement according to claim 1, wherein the base plate comprises a narrow central section and wide end sections configured to be located toward lateral flanks of the motor vehicle, and wherein at least one air passage opening is formed in each end section.

5. The air and water guiding arrangement according to claim 4, wherein several air passage openings are formed in an end section.

6. The air and water guiding arrangement according to claim 4, wherein the base plate forms a laterally sloping trench between the walls of two air passage openings.

7. The air and water guiding arrangement according to claim 1, wherein an upper edge of a passage of the transverse wall does not lie higher than the upper edge of the wall of the air passage opening located closest to the passage.

8. The air and water guiding arrangement according to claim 7 wherein the base plate forms a laterally sloping trench between the walls of two air passage openings and at least one of the passages of the transverse wall is aligned with a rear end of one of the trenches.

9. The air and water guiding arrangement according to claim 1, further comprising a channel configured to extend in the lateral direction of the vehicle between the windshield and a rear edge of the base plate.

10. The air and water guiding arrangement according to claim 9, further comprising an apron configured to tightly adjoin a lower edge region of the windshield.

11. The air and water guiding arrangement according to claim 10, wherein the base plate, the channel and the apron form an integrally molded plastic component.

12. The air and water guiding arrangement according to claim 1, wherein a front edge of the base plate is configured to tightly adjoin the hood.

13. The air and water guiding arrangement according to claim 12, further comprising an upwardly protruding rib formed on the front edge of the base plate and an elastic seal carried on the rib and configured to contact the hood.

14. The air and water guiding arrangement according to claim 1, wherein the air passage opening is configured to feed fresh air to a passenger compartment.

15. An air and water guiding arrangement configured to extend from a base of a windshield underneath a hood, the air and water guiding arrangement comprising:

a base plate having at least one air passage opening underneath the hood;

a transverse wall having recessed air passages extending from the base plate and configured to extend along a rear edge of the hood;

a water-impermeable wall surrounding the air passage opening and rising from the base plate on all sides; and a channel configured to extend in the lateral direction of the vehicle between the windshield and a rear edge of the base plate.

16. A motor vehicle comprising:

a vehicle body having a passenger compartment, a windshield and a hood; and an air and water guiding arrangement extending from a base of the windshield underneath the hood, the air and water guiding arrangement including a base plate having at least one air passage opening underneath the hood, and a transverse wall having recessed air passages extending from the base plate and extending along a rear edge of the hood;

wherein the air passage opening is configured to feed fresh air to a passenger compartment.

* * * * *